United States Patent [19]

Mouri

[11] Patent Number: 5,009,469
[45] Date of Patent: Apr. 23, 1991

[54] VEHICLE SEAT WITH SEATBELT BUCKLER RECEIVER

[75] Inventor: Takayuki Mouri, Kanagawa, Japan

[73] Assignee: Ikeda Bussan Co., Ltd., Ayase, Japan

[21] Appl. No.: 499,208

[22] Filed: Mar. 22, 1990

Related U.S. Application Data

[63] Continuation of Ser. No. 345,183, May 1, 1989, abandoned.

[30] Foreign Application Priority Data

Sep. 21, 1988 [JP] Japan ............................ 63-123886[U]

[51] Int. Cl.⁵ .................................................. B60R 21/00
[52] U.S. Cl. .................................... 297/468; 297/481
[58] Field of Search ................ 297/481, 482, 468, 191

[56] References Cited

U.S. PATENT DOCUMENTS 3,287,061 11/1966 Nicholas ............................ 297/481
3,740,094 6/1973 Hornyak ............................ 297/481
4,687,254 8/1987 Baumert et al. .................... 297/481
4,810,037 3/1989 Takagi ............................... 297/481

FOREIGN PATENT DOCUMENTS 3128571 2/1983 Fed. Rep. of Germany .
2408360 6/1979 France .
1172458 12/1969 United Kingdom ............... 297/481

Primary Examiner—Peter A. Aschenbrenner
Attorney, Agent, or Firm—Foley & Lardner

[57] ABSTRACT

A vehicle seat for use with at least two seatbelt assemblies is disclosed. Each seatbelt assembly has a belt, a tongue member and a buckle member. The vehicle seat comprises a seat portion; a seatback portion having a recess; a receptacle member tightly received in the recess and having an opening which faces forward, the receptacle member being so sized as to receive therein the buckle members which are in overlapped condition.

11 Claims, 2 Drawing Sheets

VEHICLE SEAT WITH SEATBELT BUCKLER RECEIVER

This application is a continuation of application Ser. No. 07/345,183, filed May 3,1989.

BACKGROUND OF THE INVENTION

1. Field of the Invention

The present invention relates in general to vehicle seats, and more particularly, to vehicle seats of a so-called "three-occupants type". More specifically, the present invention is concerned with a three-occupants type vehicle seat which is equipped with three sets of seat belt assemblies.

2. Description of the Prior Art

In order to clarify the task of the present invention, one conventional vehicle seat of the abovementioned type will be described with reference to FIGS. 4 and 5 of the accompanying drawings.

The vehicle seat 1 comprises a seat portion 1b and a seatback portion 1a and has three, viz., first, second and third seatbelt assemblies. The first and second seatbelt assemblies are of a so-called "three-points type" which comprises a belt 2a having a lower end fixed to a vehicle body and an upper end held by an emergency lock type belt retractor (not shown), a tongue member 3a slidably carried by the belt 2a and a buckle member $4a_1$ or $4a_2$ connected through a short strap to a rear part of the seat portion 1b. The third seatbelt assembly is of a so-called "two-points type" which comprises a belt 2b having one end anchored to the rear part of the seat portion 1b, a tongue member 3b fixed to the other end of the belt 2b and a buckle member 4b connected through a short strap to the rear part of the seat portion 1b. Although the belt 2b is illustrated to be very short, the same has its elongate major portion hidden behind the seatback portion 1a.

Designated by numeral 5 are three, viz., first, second and third receptacle members which are tightly received in respective recesses formed in a lower center area of the seatback portion 1a. As is seen from FIG. 5 which is a sectional view taken along the line V—V of FIG. 4, each receptacle member 5 is constructed of a moulded plastic and has an opening 5b which faces forward. The receptacle member 5 has two pawls 5a at opposed side wall portions of the opening 5b.

When the seatbelt assemblies are not in use, the buckle members $4a_1$, $4a_2$ and 4b are snugly put in the receptacle members 5 respectively. With this, the appearance of the seat 1 is somewhat improved. Furthermore, when the buckle members are put in the receptacle members 5, loading of luggages onto the seat portion 1b is facilitated.

However, the above-mentioned vehicle seat 1 has the following drawbacks.

First, providing the seatback portion 1a with the three recesses for the receptacle members 5 is liable to cause considerable lowering in mechanical strength of the seatback portion 1a.

Second, although the three buckle members $4a_1$, $4a_2$ and 4b are allowed to be neatly put in the respective receptacle members 5, there is no means for receiving or holding the third buckle member 3b. This may interrupt the easy luggage loading onto the seat.

SUMMARY OF THE INVENTION

It is therefore an object of the present invention to provide a vehicle seat which is free of the abovementioned drawbacks.

According to the present invention, there is provided a vehicle seat which has at a seatback portion thereof receptacle members each of which is constructed to accommodate two buckle members of seatbelt assemblies.

According to one aspect of the present invention, there is provided a vehicle seat for use with at least two seatbelt assemblies each including a belt, a tongue member and a buckle member. The vehicle seat comprises a seat portion; a seatback portion having a recess; a receptacle member tightly received in the recess and having an opening which faces forward, the receptacle member being so sized as to receive therein the buckle members which are in overlapped condition.

According to the other aspect of the present invention, there is provided an arrangement in a motor vehicle. The arrangement comprises a seat having a seat portion and a seatback portion; first and second seatbelt assemblies, each assembly including a belt, a tongue member slidably carried by the belt and a buckle member connected to the seat through a strap; a third seatbelt assembly including a belt having one end connected to the seat, a tongue member connected to the other end of the belt and a buckle member connected to the seat through a strap; means defining in a lower center area of the seatback portion two spaced recesses; and two receptacle members tightly received in the recesses respectively, wherein each of the receptacle members is so sized as to receive therein two of a group consisting of the buckle members of the first, second and third seatbelt assemblies and the tongue member of the third seatbelt assembly.

BRIEF DESCRIPTION OF THE DRAWINGS

Other objects and advantages of the present invention will become apparent from the following description when taken in conjunction with the in which.

DETAILED DESCRIPTION OF THE INVENTION

Figure 1:
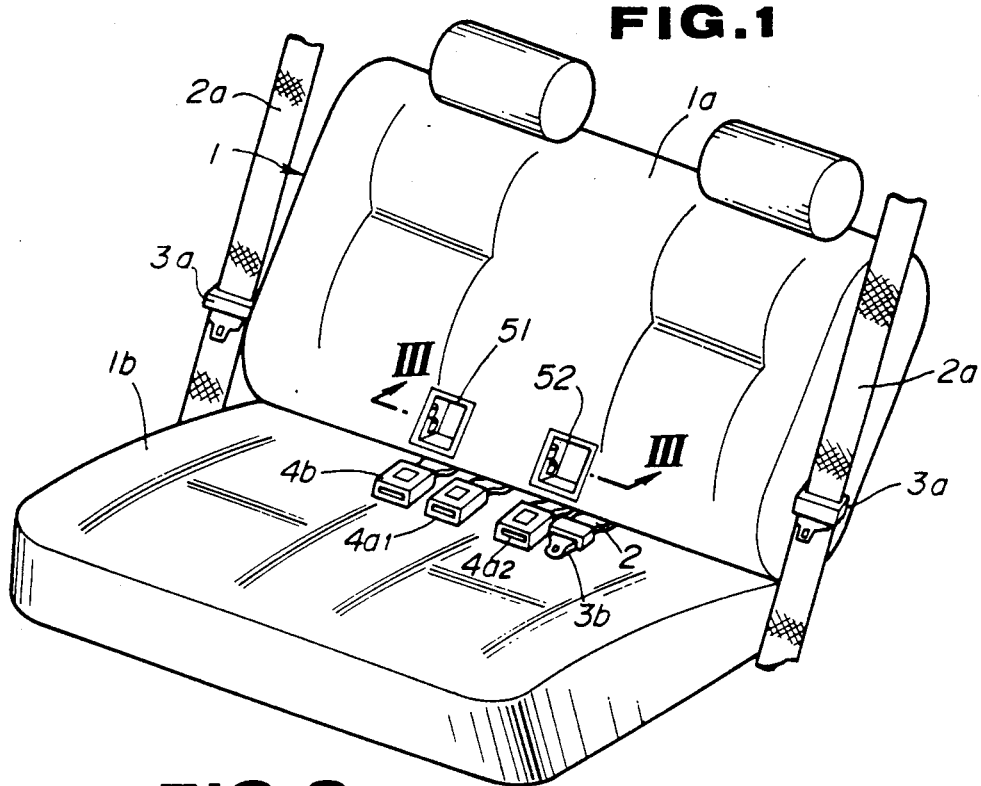
FIG. 1 is a perspective view of a three-occupants type vehicle seat according to the present invention.
Figure 2:
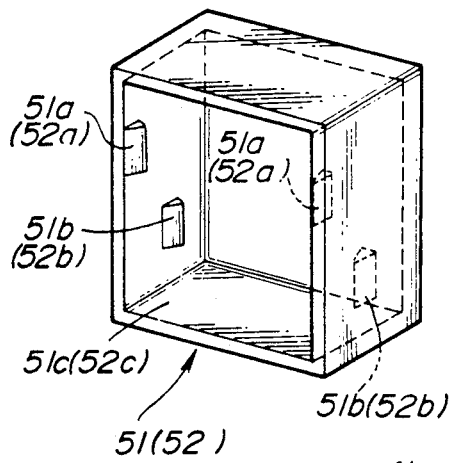
FIG. 2 is a perspective and enlarged view of a receptacle member employed in the invention.
Figure 3:
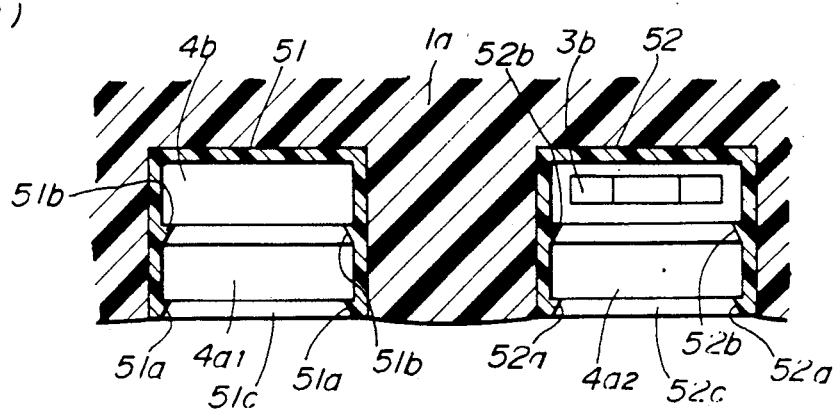
FIG. 3 an enlarged sectional view taken along the line III—III of FIG. 1, but with buckle and tongue members kept in receptacle members.
Figure 4:
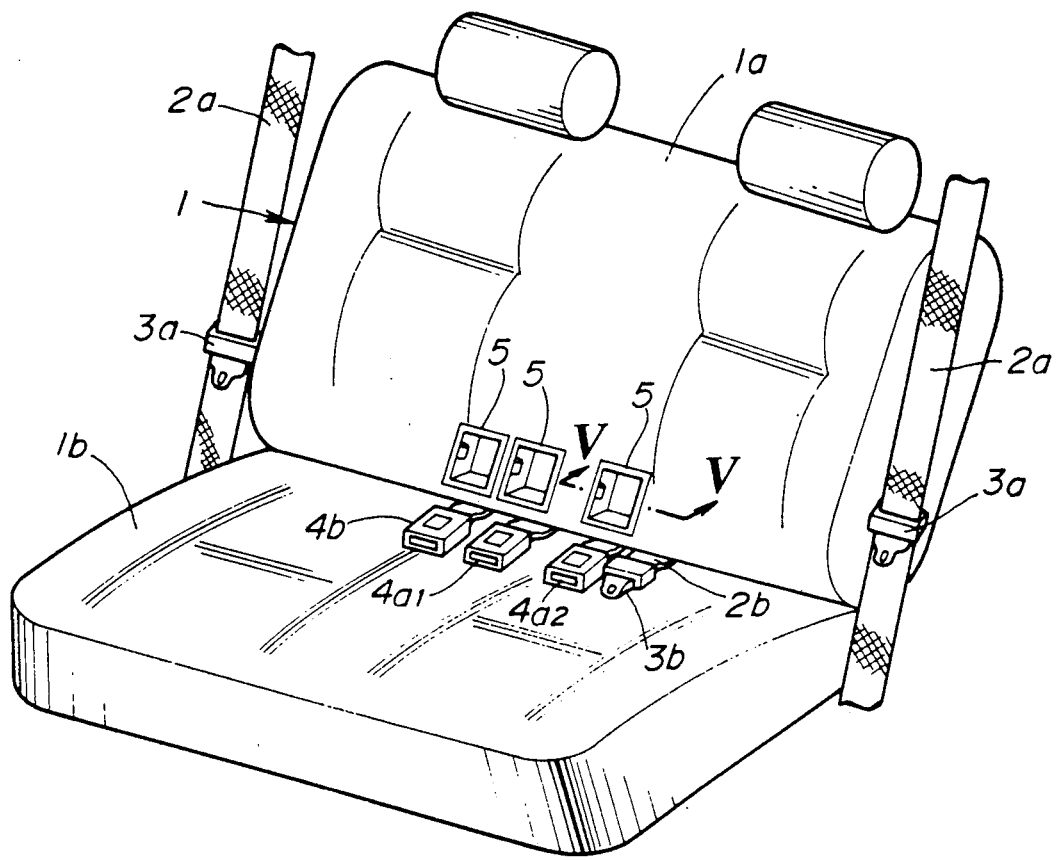
FIG. 4 is a perspective view of a conventional type vehicle seat.
Figure 5:
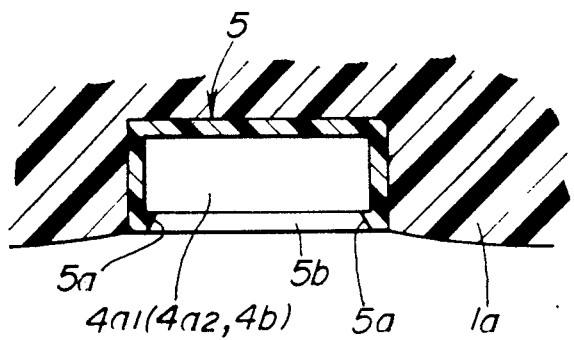
FIG. 5 is an enlarged sectional view taken along the line V—V of FIG. 4.

Referring to FIGS. 1 to 3, particularly FIG. 1, there is shown a three-occupants type vehicle seat 1 acccording to the present invention. Since the seat 1 is substantially the same as the above-mentioned conventional seat except for the receptacle members possessed by the seatback portion, the following description will be directed to only the receptacle members. The parts which are the same as those of the conventional seat are denoted by the same numerals.

As is seen from FIG. 1, in accordance with the present invention, only two, that is, first and second receptacle members 51 and 52 are employed, which are received in laterally spaced recesses formed in a lower center part of the front surface of the seatback portion 1a.

As is seen from FIG. 2, each receptacle member 51 or 52 is constructed of a moulded plastic and has an opening 51c or 52c which faces forward. It is to be noted that each receptacle member is so sized as to receive two buckle members in overlapped condition parallel to the front surface of the seatback portion. In other words, the depth of the receptacle member, is substantially twice as long as the thickness of each buckle member so that it can receive the buckle members in the vertically overlapped condition illustrated in FIG. 3.

Each receptacle member 51 (or 52) is formed at its opposed side wall portions with first and second pairs of pawls 51a (or 52a) and 51b (or 52b). As is seen from FIG. 2, the first pair 51a (or 52a) are arranged at front upper parts of the side wall portions, while the second pair 51b (or 52b) are arranged at back lower parts of the side wall portions.

As is understood from FIG. 3, the first pair 51a and second pair 51b of the receptacle member 51 are used for detachably catching the first buckle member 4a₁ and the third buckle member 4b respectively, while the first pair 52a and the second pair 52b of the other receptacle member 52 are used for detachably catching the second buckle member 4a₂ and the third tongue member 3b respectively. It is to be noted that the pairs 51b and 52b arranged at the back portions of the receptacle members 51 and 52 are used for the third seatbelt assembly whose frequency in use is less than the other two seatbelt assemblies.

As is understood from the foregoing description, in accordance with the invention, only two recesses are needed in the seatback portion 1a. Thus, reduction in mechanical strength of the seat portion 1a is small as compared with the above-mentioned conventional seat.

Since also the third tongue member 3b can be held by the receptacle member 52, luggage loading onto the seat is easily carried out without interruption. This improves the external appearance of the seat 1 very much.

What is claimed is:

1. A vehicle seat comprising:
    at least two seatbelt assemblies each including a belt, a tongue member and a buckle member;
    a seat portion;
    a seatback portion including a front surface having a recess therein;
    one receptacle member for each seatbelt assembly tightly received in said recess and having an opening which faces forward, said receptacle member having a depth which is substantially twice the thickness of each buckle member and being adapted to receive therein said buckle members in a vertically overlapped condition and parallel to said front surface of said seatback portion.

2. A vehicle seat as claimed in claim 1, in which said receptacle member is formed at its opposed side wall portions with first and second pairs of pawls for detachably catching said buckle members respectively.

3. A vehicle seat as claimed in claim 2, in which said first pair are arranged at front upper parts of said opposed side wall portions, while, said second pair are arranged at back lower parts of said opposed side wall portions.

4. A vehicle seat as claimed in claim 3, in which said recess is located at a lower center part of said seatback portion and said receptacle member is constructed of a molded plastic.

5. In a motor vehicle,
    a seat having a seat portion and a seatback portion, said seatback portion including a front surface;
    first and second seatbelt assemblies, each assembly including a belt, a tongue member slidably carried by said belt and a buckle member connected to said seat through a strap;
    a third seatbelt assembly including a belt having one end connected to said seat, a tongue member connected to the other end of said belt and a buckle member connected to said seat through a strap;
    means defining in a lower center area of said front surface of said seatback portion two spaced recesses; and
    two receptacle members tightly received in said recesses respectively;
    wherein each of said receptacle members has a depth which is substantially twice the thickness of each buckle member and is adapted to receive therein parallel to said front surface of said seatback portion and in a vertically overlapped condition two of a group consisting of said buckle members of said first, second and third seatbelt assemblies and said tongue member of said third seatbelt assembly.

6. A motor vehicle as claimed in claim 5, in which said two of the group are overlapped when received in said receptacle member.

7. A motor vehicle as claimed in claim 6, in which each of said receptacle members is formed at its opposed side wall portions with first and second pairs of pawls for detachably catching the two when the two are received in said receptacle member.

8. A motor vehicle as claimed in claim 7, in which said first pair are arranged at front upper parts of said opposed side wall portions, while, said second pair are arranged at back lower parts of said opposed side wall portions.

9. A vehicle seat comprising:
    at least two seatbelt assemblies each including a belt, a tongue member and a buckle member;
    a seat portion;
    a seatback portion including a front surface having a recess therein;
    one receptacle member tightly received in said recess and having an opening which faces forward, said receptacle member having a depth which is substantially twice the thickness of each buckle member and being adapted to receive therein said buckle members in a vertically overlapped condition and parallel to said front surface of said seatback portion so that said buckle member received in the foremost position of said receptacle member forms a smooth surface with said front surface of said seatback portion.

10. In a motor vehicle,
    a seat having a seat portion and a seatback portion, said seatback portion including a front surface;
    first and second seatbelt assemblies, each assembly including a belt, a tongue member slidably carried by said belt and a buckle member connected to said seat through a strap;
    a third seatbelt assembly including a belt having one end connected to said seat, a tongue member connected to the other end of said belt and a buckle member connected to said seat through a strap;

means defining in a lower center area of said front surface of said seatback portion two spaced recesses; and two receptacle members tightly received in said recesses respectively, wherein each of said receptacle members has a depth which is substantially twice the thickness of each buckle member and is adapted to receive therein parallel to said front surface of said seatback portion and in a vertically overlapped condition two of a group consisting of said buckle members of said first, second and third seatbelt assemblies and said tongue member of said third seatbelt assembly, wherein said buckle members received in said receptacle members form a smooth surface with said front surface of said seatback portion.

11. A seat as claimed in claim 10, wherein each of said receptacle members is formed at its opposed side wall portions with first and second pair of pawls, each of them for detachably catching one of said two of a group consisting of said buckle members of said first, second and third seatbelt assemblies and said tongue member of said third seatbelt assembly.

* * * * *